E. LAW.
WAGON DOG.
APPLICATION FILED JUNE 30, 1908.
913,740.
Patented Mar. 2, 1909.
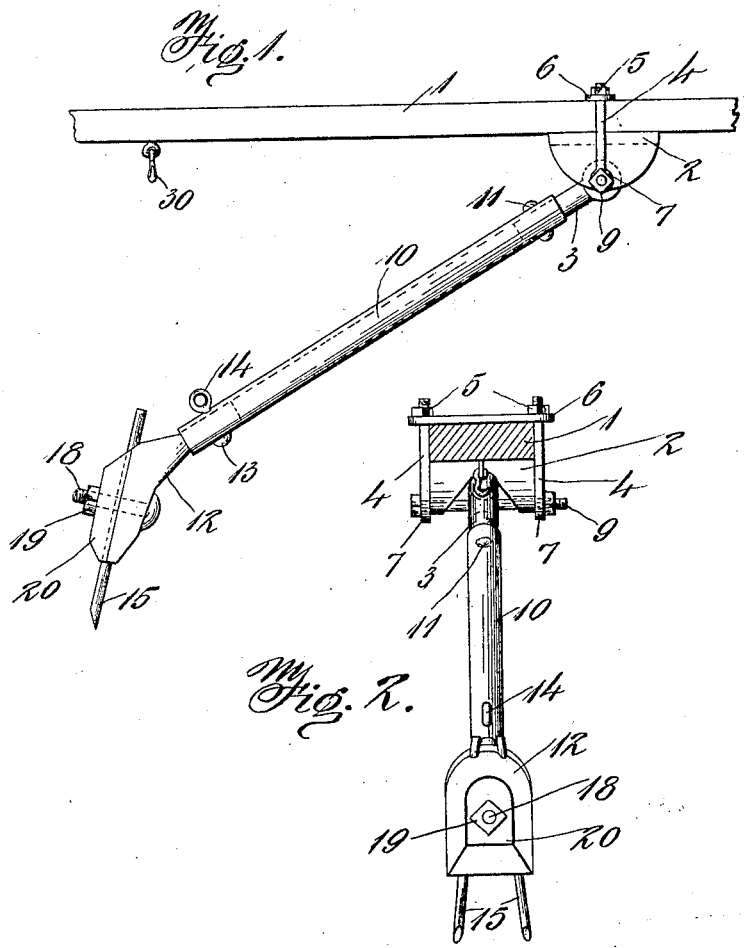
WITNESSES:
INVENTOR
Elmer Law
BY
Attorneys

UNITED STATES PATENT OFFICE.

ELMER LAW, OF NEW CONCORD, OHIO.

WAGON-DOG.

No. 913,740.  Specification of Letters Patent.  Patented March 2, 1909.

Application filed June 30, 1908. Serial No. 441,217.

*To all whom it may concern:*

Be it known that I, ELMER LAW, citizen of the United States, residing at New Concord, in the county of Muskingum and State of Ohio, have invented certain new and useful Improvements in Wagon-Dogs, of which the following is a specification.

This invention is a wagon dog, and it is designed particularly for use in heavy hauling in hilly country, and comprises a pivoted arm attached to a wagon and adapted to trail on the ground and which will prevent the wagon from slipping back after stopping upon an incline, and will be found particularly useful in case of accidents or while resting the team.

The invention is illustrated in the accompanying drawings, in which—

Figure 1 is a side view thereof. Fig. 2 is a rear view.

Referring specifically to the drawings, 1 indicates a wagon reach, and 2 is a block secured to the under side thereof, preferably near the front axle, by means of eye bolts 4 through the eyes 7 of which a bolt 9 extends, in a groove on the under side of the block 2. The bolts 4 have nuts 5 at the upper end which bind a cross or clamp plate 6 upon the reach.

3 indicates a stem which is pivoted at its upper end on the bolt 9, the eye at the head of said stem fitting in a flaring recess between cheeks on the block 2. The recess is flared and the eye is loosely held to allow side swing, should the wagon turn and the dog catch. If the stem were rigidly held it would break under side strain. The stem 3 receives a sleeve 10 which is riveted thereto, as at 11. At the lower end the sleeve 10 receives the shank of a casting 12, secured by a rivet 13 having a ring 14 by means of which the device may be hung on the hook 30 connected to the reach and thus held in inoperative position. The face of the casting 12 is grooved to hold two spikes 15 which are attached thereto by means of a corresponding grooved plate 20 which is connected to the part by the bolt 18 and nut 19. By loosening the bolt the spikes can be moved up or down, or turned around to present the point to the ground at an acute angle. As fast as the spikes become worn they can be turned for this purpose, thereby insuring engagement with the ground at all times. As fast as the spikes become worn they can be lowered as desired, or new spikes can be inserted. Consequently the device may be used for a long time. The nut 19 may, if desired, be provided with any suitable form of nut lock to prevent the same coming off.

The action of the device is believed to be obvious from the above description. In going up hill the dog will, if considered necessary, be dropped and allowed to trail, and will catch and hold the wagon on failure of the draft means from any cause.

I claim:

A wagon dog comprising a recessed block adapted to fit against the under side of the wagon reach, a bolt extending across the recess and under the block, clamping bolts connected to said bolt and the reach to hold the block in place, and an arm pivoted at its upper end upon said bolt and in said recess and having ground engaging devices at its lower end.

In testimony whereof I affix my signature in presence of two witnesses.

ELMER LAW.

Witnesses:
 T. J. HUKILL,
 HESTER HUKILL.